(12) United States Patent
Misono et al.

(10) Patent No.: US 7,903,200 B2
(45) Date of Patent: Mar. 8, 2011

(54) LIQUID CRYSTAL DISPLAY DEVICE AND MOBILE ELECTRONIC DEVICE USING THE SAME

(75) Inventors: Kenji Misono, Nara (JP); Mitsuhiro Murata, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 538 days.

(21) Appl. No.: 11/997,775

(22) PCT Filed: Aug. 1, 2006

(86) PCT No.: PCT/JP2006/315229
§ 371 (c)(1),
(2), (4) Date: Feb. 4, 2008

(87) PCT Pub. No.: WO2007/018079
PCT Pub. Date: Feb. 15, 2007

(65) Prior Publication Data
US 2010/0220264 A1      Sep. 2, 2010

(30) Foreign Application Priority Data

Aug. 5, 2005   (JP) .................................. 2005-227943

(51) Int. Cl.
*G02F 1/1335*      (2006.01)
(52) U.S. Cl. ............................................. 349/65; 349/61
(58) Field of Classification Search .................. None
See application file for complete search history.

(56) References Cited

U.S. PATENT DOCUMENTS

| | | | | |
|---|---|---|---|---|
| 5,764,322 | A * | 6/1998 | Mamiya et al. ................. | 349/65 |
| 6,147,725 | A * | 11/2000 | Yuuki et al. ..................... | 349/65 |
| 7,542,117 | B2 * | 6/2009 | Murata et al. .................. | 349/115 |
| 2002/0039155 | A1 * | 4/2002 | Umemoto ....................... | 349/61 |
| 2002/0172031 | A1 | 11/2002 | Masuda | |
| 2003/0218701 | A1 * | 11/2003 | Kawakami ...................... | 349/65 |
| 2005/0162865 | A1 | 7/2005 | Tsuda et al. | |
| 2006/0055850 | A1 | 3/2006 | Murata et al. | |

FOREIGN PATENT DOCUMENTS

JP            8-94844 A         4/1996
(Continued)

OTHER PUBLICATIONS

English translation of the official communication issued in counterpart International Application No. PCT/JP2006/315229, mailed on Feb. 14, 2008.
Official Communication for PCT Application No. PCT/JP2006/315229; mailed on Aug. 29, 2006.

*Primary Examiner* — Tina M Wong
(74) *Attorney, Agent, or Firm* — Keating & Bennett, LLP

(57) ABSTRACT

There is provided a liquid crystal display device which can easily be made thin and which is capable of high-quality displaying, as well as a mobile electronic device having the same. A liquid crystal display device according to the present invention includes: a first substrate; a second substrate disposed so as to be closer to a viewer than the first substrate is; a liquid crystal layer provided therebetween; and a linear light source provided by a side of the first substrate, the linear light source emitting light toward a side face of the first substrate. The first substrate includes a selective reflection layer for selectively reflecting light of a specific polarization state, and the linear light source includes a point light source and a linear light guiding member for guiding light emitted from the point light source to the side face of the first substrate. The linear light guiding member includes: a selective-reflection portion for selectively reflecting light of a first polarization state out of light which enters into the linear light guiding member from the point light source; and a polarization conversion portion for, out of the light which enters into the linear light guiding member from the point light source, converting light of a second polarization state into light of the first polarization state, the second polarization state being different from the first polarization state.

12 Claims, 8 Drawing Sheets

FOREIGN PATENT DOCUMENTS

| | | |
|---|---|---|
| JP | 2003-131228 A | 5/2003 |
| JP | 2003-215585 A | 7/2003 |
| JP | 2004-61619 A | 2/2004 |
| JP | 2004-246100 A | 9/2004 |
| JP | 2005-134470 A | 5/2005 |

* cited by examiner

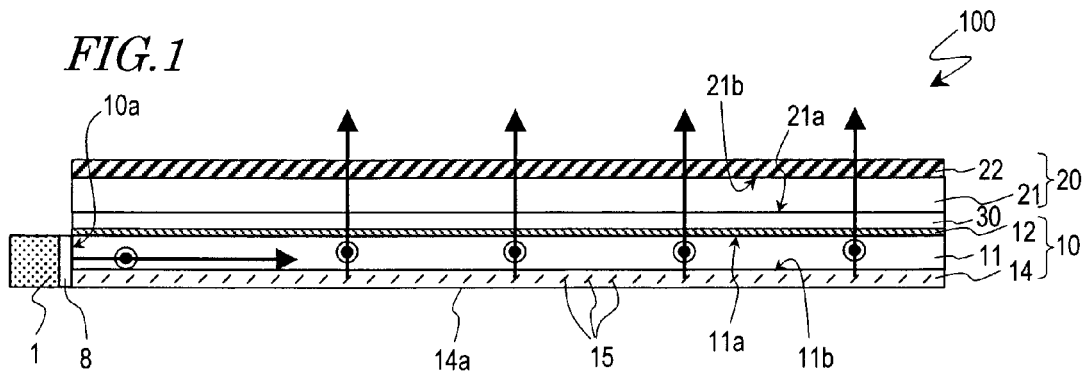
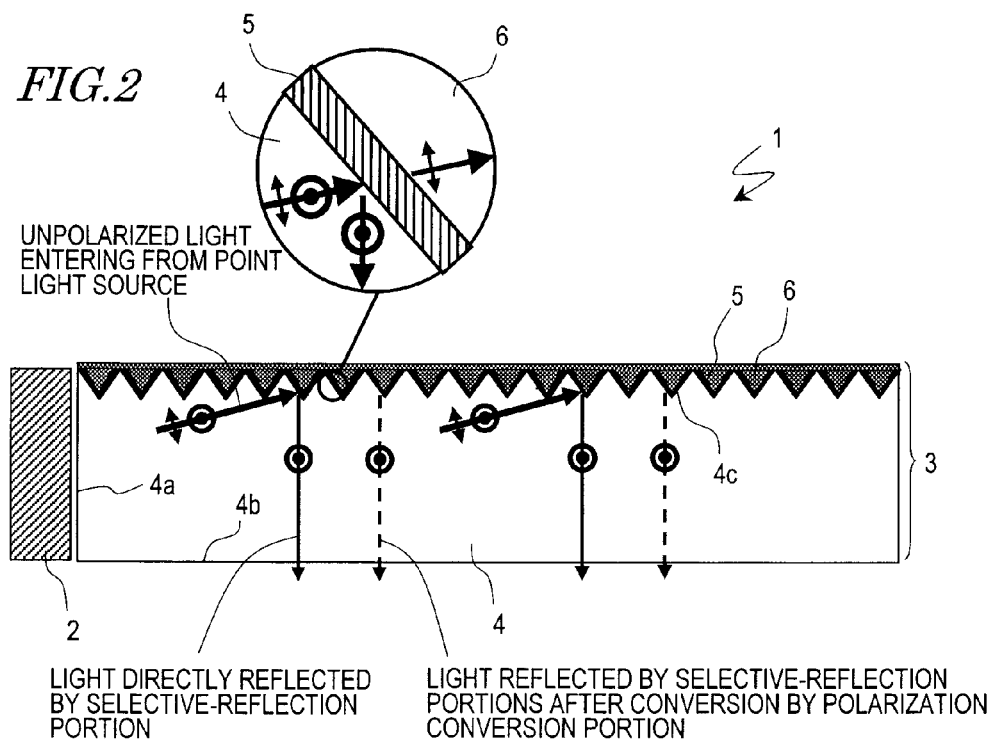
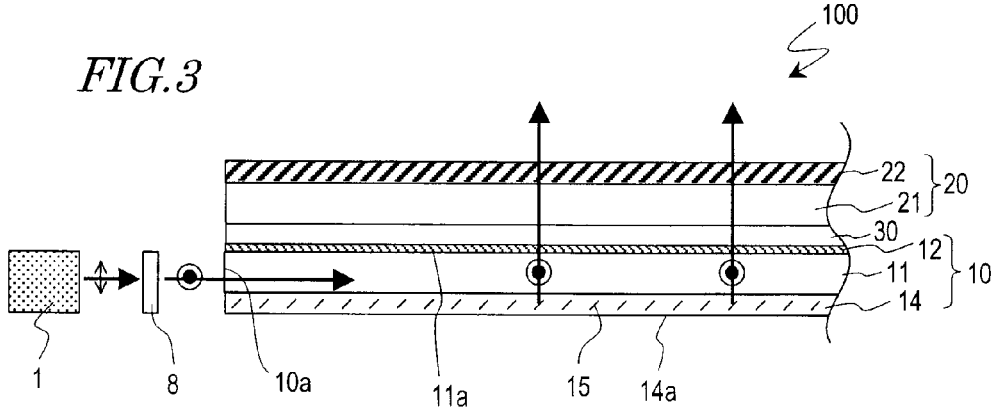

FIG.7
(a)
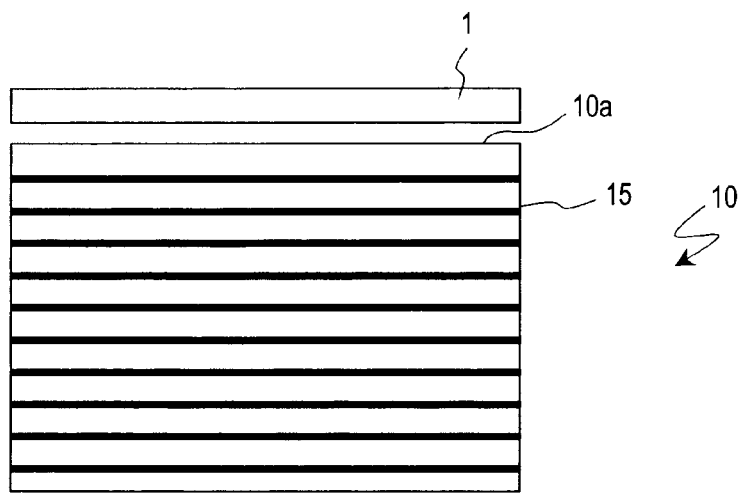
(b)
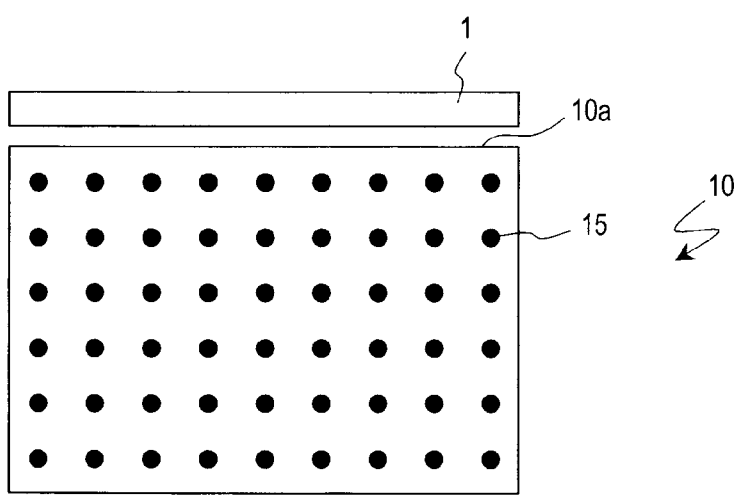

FIG.8
(a)
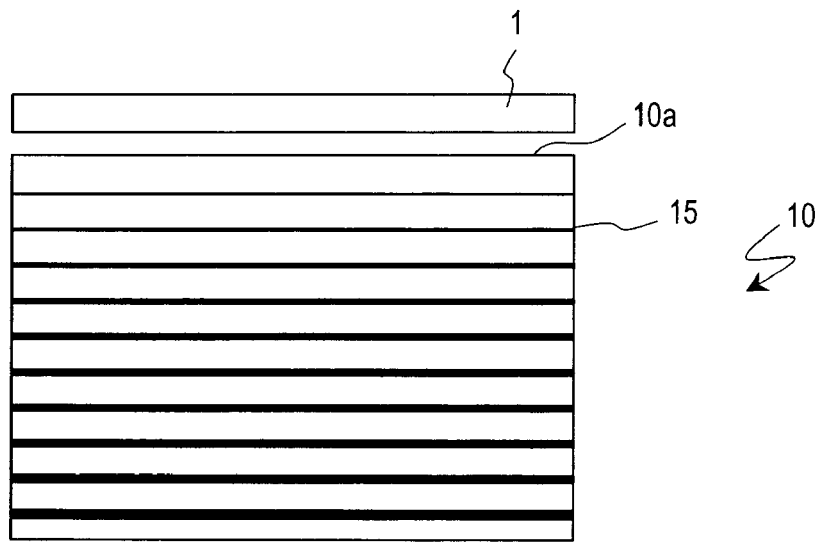
(b)
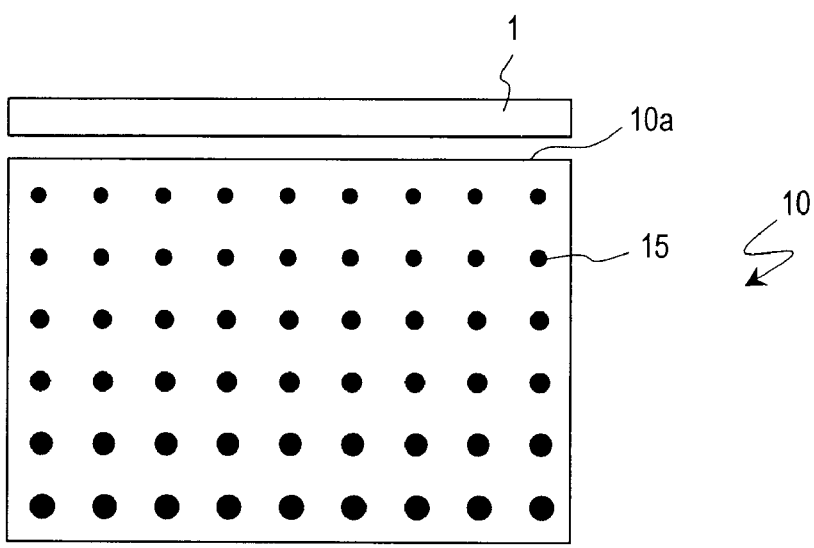

FIG.9
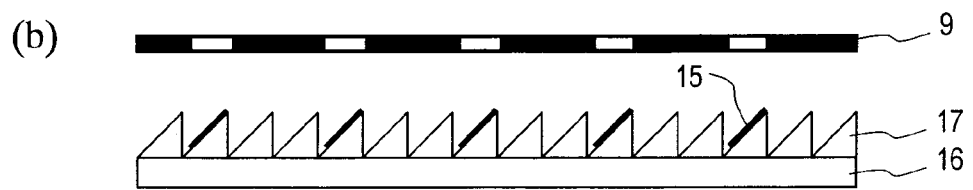
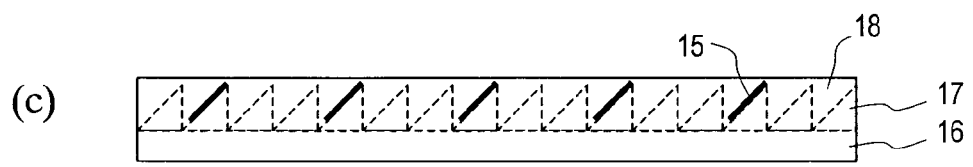
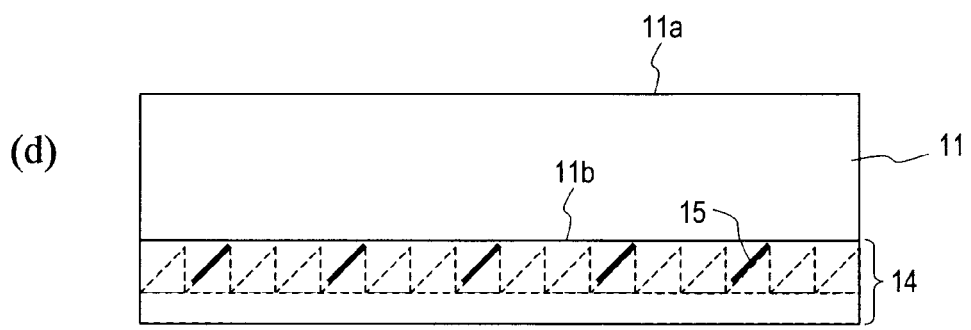

FIG.10
(a) 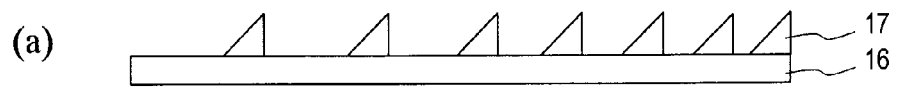
(b) 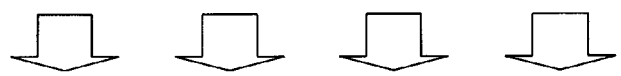
(c) 
(d) 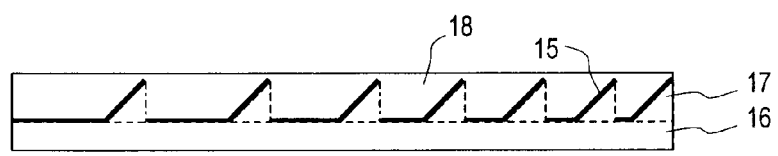
FIG.11
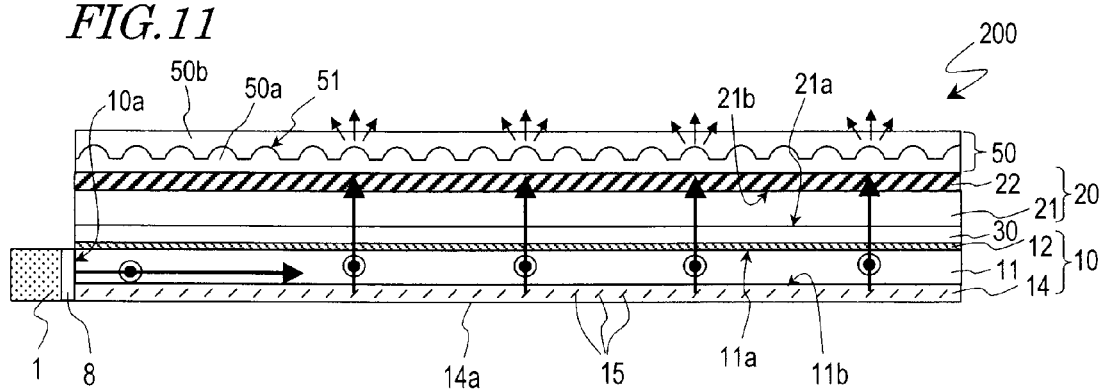

FIG.12
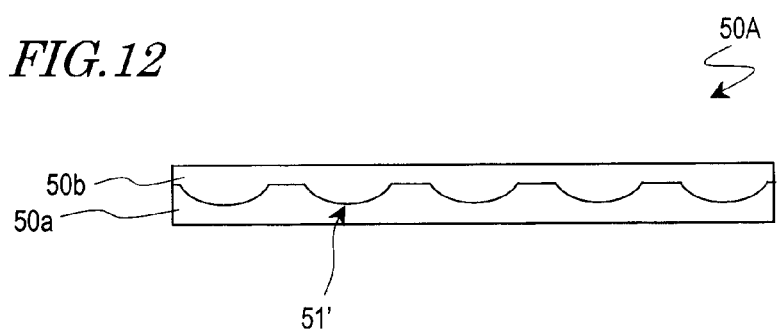
FIG.13
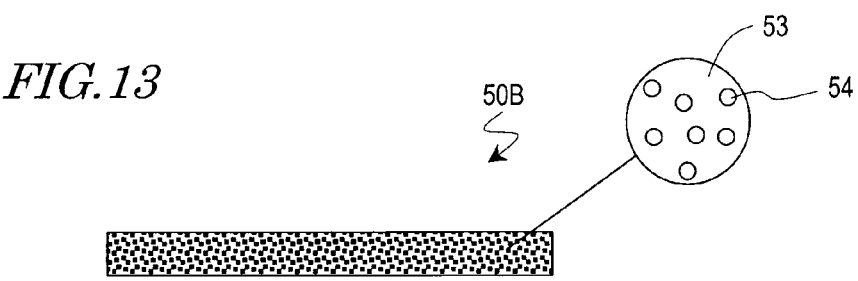
FIG.14
(a)
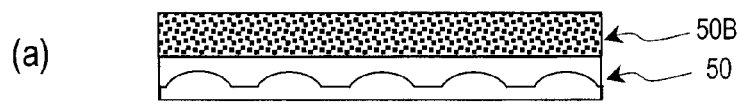
(b)
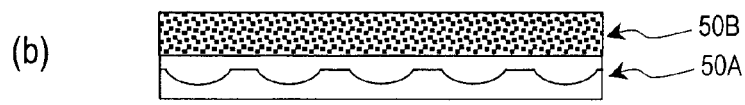
FIG.15
PRIOR ART
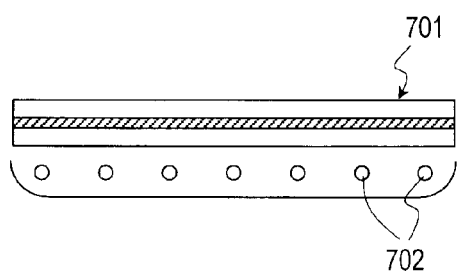

LIQUID CRYSTAL DISPLAY DEVICE AND MOBILE ELECTRONIC DEVICE USING THE SAME

BACKGROUND OF THE INVENTION

1. Field of the Invention

The present invention relates to a liquid crystal display device, and in particular to a liquid crystal display device which is suitably used for a mobile electronic device.

2. Description of the Related Art

In recent years, mobile electronic devices such as mobile phones and PDAs (Personal Digital Assistants) are in wide use. In a display section of a mobile electronic device, a liquid crystal display device is used because of its advantages in terms of thinness, light weight, and low power consumption.

A liquid crystal display device is a non-emission type display device, and therefore includes an illuminator called a backlight, so that light from the backlight is utilized in performing display. A backlight is generally composed of a light source, a reflection plate, a light guiding plate, a lens sheet, and the like. Since the thickness of a backlight greatly affects the overall thickness of the liquid crystal display device, a thin backlight must be used in order to realize a thin liquid crystal display device.

Backlights are generally classified into the "direct type", such as that which is disclosed in Patent Document 1, and the "edge light type", such as that which is disclosed in Patent Document 2. The "direct type" includes, as shown in FIG. 15, a plurality of light sources 702 (such as cold-cathode tubes) which are disposed immediately under a liquid crystal display panel 701. On the other hand, the "edge light type" includes, as shown in FIG. 16, a light source 802 disposed by a side of a light guiding plate 803, which is provided immediately under a liquid crystal display panel 801, such that the light from the light source 802 is led to the liquid crystal display panel 801 by the light guiding plate 803.

Since an edge light type backlight can be made thin more easily than a direct type backlight, edge light type backlights are currently used in many small-sized liquid crystal display devices.

[Patent Document 1] Japanese Laid-Open Patent Publication No. 2003-215585

[Patent Document 2] Japanese Laid-Open Patent Publication No. 8-94844

SUMMARY OF THE INVENTION

Problems to be Solved by the Invention

However, liquid crystal display devices are required to become even thinner due to the recent explosive prevalence of mobile electronic devices. Moreover, displaying with a higher brightness and a higher contrast ratio than before is being required. Such needs cannot be satisfied by conventional edge light type backlights.

The present invention has been made in view of the above problems, and an objective thereof is to provide: a liquid crystal display device which can easily be made thin and which is capable of high-quality displaying; and a mobile electronic device having the same.

Means for Solving the Problem

A liquid crystal display device according to the present invention comprises: a first substrate; a second substrate disposed so as to be closer to a viewer than the first substrate is; a liquid crystal layer provided between the first substrate and the second substrate; and a linear light source provided by a side of the first substrate, the linear light source emitting light toward a side face of the first substrate, wherein, the first substrate includes a selective reflection layer for selectively reflecting light of a specific polarization state; the linear light source includes a point light source and a linear light guiding member for guiding light emitted from the point light source to the side face of the first substrate; and the linear light guiding member includes: a selective-reflection portion for selectively reflecting light of a first polarization state out of light which enters into the linear light guiding member from the point light source; and a polarization conversion portion for, out of the light which enters into the linear light guiding member from the point light source, converting light of a second polarization state into light of the first polarization state, the second polarization state being different from the first polarization state. Thus, the aforementioned objective is met.

In a preferred embodiment, light of the first polarization state is linearly polarized light whose polarization direction is parallel to the first direction, and light of the second polarization state is linearly polarized light whose polarization direction is parallel to a second direction which is orthogonal to the first direction.

In a preferred embodiment, the selective reflection layer of the first substrate selectively reflects linearly polarized light of a specific polarization direction.

In a preferred embodiment, the selective-reflection portion of the linear light guiding member includes a dielectric film.

In a preferred embodiment, the polarization conversion portion is composed of a material having birefringence.

In a preferred embodiment, the polarization conversion portion is a ½ wavelength plate.

In a preferred embodiment, the linear light guiding member has a first side face at which light from the point light source is received and a second side face through which light is emitted toward the side face of the first substrate.

In a preferred embodiment, the selective-reflection portion is disposed between the polarization conversion portion and the second side face.

In a preferred embodiment, the first substrate includes: a transparent substrate; and a low-refractive index layer formed on a principal face of the transparent substrate closer to the liquid crystal layer, the low-refractive index layer having a refractive index lower than a refractive index of the transparent substrate.

In a preferred embodiment, the selective reflection layer is provided on a principal face of the transparent substrate opposite from the liquid crystal layer.

In a preferred embodiment, the liquid crystal display device according to the present invention further comprises a light diffusing element disposed so as to be closer to the viewer than the liquid crystal layer is, the light diffusing element diffusing light which has passed through the liquid crystal layer.

A mobile electronic device according to the present invention comprises a liquid crystal display device having the aforementioned constitution. Thus, the aforementioned objective is met.

Effects of the Invention

According to the present invention, there is provided a liquid crystal display device which can easily be made thinner than conventionally and which is capable of high-quality displaying. A liquid crystal display device according to the present invention is suitably used in various types of mobile electronic devices.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 1 A cross-sectional view schematically showing a liquid crystal display device 100 according to a preferred embodiment of the present invention.

FIG. 2 An upper plan view schematically showing a linear light source included in the liquid crystal display device 100.

FIG. 3 A diagram for explaining changes in the polarization direction of light which is emitted from a linear light source.

FIGS. 7 (a) and (b) are diagrams each showing exemplary shapes of dielectric films included in a selective reflection layer.

FIGS. 8 (a) and (b) are diagrams each showing other exemplary shapes of dielectric films included in a selective reflection layer.

FIG. 9 (a) to (d) are step-by-step cross-sectional views schematically showing steps of forming a selective reflection layer.

FIG. 10 (a) to (d) are step-by-step cross-sectional views schematically showing steps of forming a selective reflection layer.

FIG. 11 A cross-sectional view schematically showing another liquid crystal display device 200 according to a preferred embodiment of the present invention.

FIG. 12 A cross-sectional view showing another example of a light diffusing element used in the liquid crystal display device 200.

FIG. 13 A cross-sectional view showing another example of a light diffusing element used in the liquid crystal display device 200.

FIGS. 14 (a) and (b) are cross-sectional views showing other examples of light diffusing elements used in the liquid crystal display device 200.

FIG. 15 A cross-sectional view schematically showing a commonly-used liquid crystal display device comprising a direct type backlight.

DETAILED DESCRIPTION OF THE PREFERRED EMBODIMENTS

Figure 4:
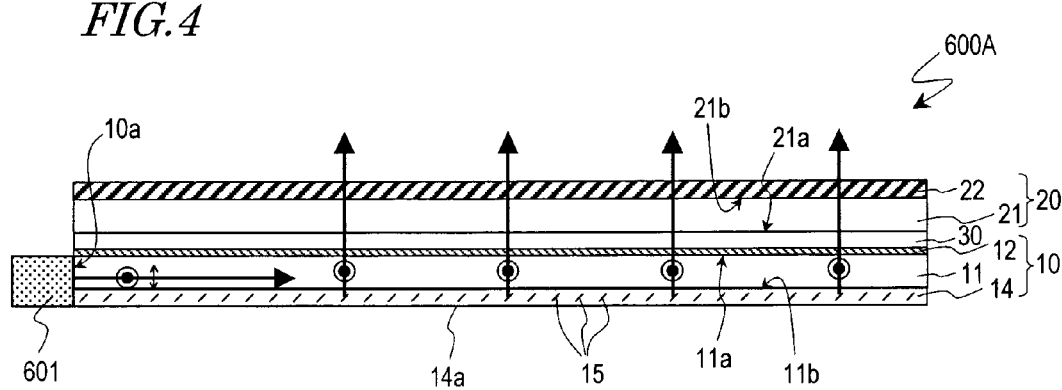
FIG. 4 A cross-sectional view schematically showing a liquid crystal display device 600A of Comparative Example having a linear light source which emits unpolarized light.

Hereinafter, an embodiment of the present invention will be described with reference to the drawings. Note that the present invention is not to be limited to the following embodiment.

FIG. 1 schematically shows a liquid crystal display device 100 according to the present embodiment. As shown in FIG. 1, the liquid crystal display device 100 includes: a pair of opposing substrates 10 and 20; and a liquid crystal layer 30 interposed therebetween. Hereinafter, the substrate 10, which is disposed on the rear face side, will be referred to as the "rear substrate", whereas the substrate 20, which is disposed on the front face side (viewer side), will be referred to as the "front substrate".

The rear substrate 10 includes: a transparent substrate (e.g., a glass substrate or a plastic substrate) 11; and a low-refractive index layer 12 which is formed on a principal face 11a of the transparent substrate 11 closer to the liquid crystal layer 30 (viewer side). The low-refractive index layer 12 has a lower refractive index than the refractive index of the transparent substrate 11. On the low-refractive index layer 12, electrodes for applying a voltage across the liquid crystal layer 30, and an alignment film (neither of which is shown) are further formed.

On the principal face 11b of the transparent substrate 11 opposite from the liquid crystal layer 30 side, a selective reflection layer 14 for selectively reflecting light in a specific polarization state is formed. Specifically, the selective reflection layer 14 selectively reflects linearly polarized light of a specific polarization direction.

In its interior, the selective reflection layer 14 includes a plurality of dielectric films 15. The plurality of dielectric films 15, which are tilted with respect to the principal faces 11a and 11b of the transparent substrate 11 by predetermined angles, are arrayed at a predetermined interval (pitch). Moreover, each dielectric film 15 is a single layer or multiple layers of thin film, having a different refractive index from that of the surrounding material and being formed to a predetermined thickness.

At the interface between each dielectric film 15 and the surrounding material, light reflectance has polarization dependence. Specifically, a high reflectance exists for S-polarized light, whose polarization direction is perpendicular to the incident face (i.e., a plane which contains the normal of the interface and the ray), whereas a low reflectance exists for P-polarized light, whose polarization direction is parallel to the incident face. In particular, regarding the light entering at an angle close to Brewster's angle, there is an essentially zero reflectance for P-polarized light, so that essentially only S-polarized light is reflected. Thus, at the interface between each dielectric film 15 and the surrounding material, linearly polarized light of a specific polarization direction is selectively reflected. In the present embodiment, as shown in FIG. 1, the selective reflection layer 14 selectively reflects linearly polarized light whose polarization direction is substantially parallel to the principal faces 11a and 11b of the transparent substrate 11 (i.e., perpendicularly to the plane of FIG. 1).

The front substrate 20 includes a transparent substrate 21 which is disposed so as to oppose the rear substrate 10. On a principal face 21a of the transparent substrate 21 that is closer to the liquid crystal layer 30, an electrode for applying a voltage across the liquid crystal layer 30, and an alignment film (neither of which is shown) are formed. A polarizing plate 22 is provided on the viewer-side principal face 21b of the transparent substrate 21.

By a side of the rear substrate 10, a linear light source 1 is provided. The linear light source 1 emits light toward a side face 10a of the rear substrate 10. Unlike commonly-used linear light sources, the linear light source 1 emits light of a certain polarization state, rather than light in an unpolarized state (random polarization state).

A specific structure of the linear light source 1 is shown in FIG. 2. The linear light source 1 includes a point light source 2 and a linear light guiding member 3 for guiding the light having been emitted from the point light source 2 toward the side face 10a of the rear substrate 10. The point light source 2 is a light-emitting diode (LED), for example.

The linear light guiding member 3 includes selective-reflection portions 5 for selectively reflecting, out of the light having entered into the linear light guiding member 3 from the point light source 2, light of a certain polarization state (referred to as the "first polarization state" for convenience). Moreover, the linear light guiding member 3 includes a polarization conversion portion 6 for converting light of a polarization state which is different from the first polarization state (referred to as the "second polarization state" for convenience) into light of the first polarization state.

Specifically, the selective-reflection portions 5 reflect linearly polarized light whose polarization direction is parallel to a certain direction (referred to as the "first direction" for convenience). On the other hand, specifically, the polarization conversion portion 6 rotates by 90° the polarization direction of linearly polarized light whose polarization direction is parallel to a direction which is orthogonal to the first direction (referred to as the "second direction" for convenience), thus converting it into linearly polarized light whose polarization direction is parallel to the first direction. Hereinafter, a more specific structure of the linear light guiding member 3 will be described.

The linear light guiding member 3 includes a base light guiding member 4 which is generally a rectangular solid. The base light guiding member 4 is formed of a resin, for example. The base light guiding member 4 has a side face 4a at which light from the point light source 2 is received and a side face 4b through which light is emitted toward the side face 10a of the rear substrate 10.

Furthermore, the base light guiding member 4 has a side face 4c that opposes the side face 4b through which light is emitted. As shown in FIG. 2, the side face 4c is formed as a prism array. The selective-reflection portions 5 are disposed on the side face 4c. The selective-reflection portions 5 according to the present embodiment are dielectric films which are similar to the dielectric films 15 within the selective reflection layer 14. Each dielectric film 5 functioning as the selective-reflection portions is a single layer or multiple layers of thin film which is formed to a predetermined thickness. At the interface between each dielectric film 5 and the base light guiding member 4, linearly polarized light whose polarization direction is perpendicular to the incident face (a plane which contains the normal of the interface and the ray) (i.e., perpendicular to the plane of FIG. 2) is selectively reflected.

The polarization conversion portion 6 is formed so as to cover the dielectric films 5. The polarization conversion portion 6 is composed of a material having birefringence. Therefore, the polarization conversion portion 6 is able to impart a phase difference to light passing through the polarization conversion portion 6, thereby changing the polarization state of the light. Specifically, the polarization conversion portion 6 in the present embodiment is a ½λ plate, which is able to rotate by 90° the polarization direction of the linearly polarized light which has passed through the dielectric films 5 instead of being reflected by the dielectric films 5.

The unpolarized light which has been emitted from the point light source 2 and entered into the linear light guiding member 3 via the side face 4a propagates inside the linear light guiding member 3, in a direction away from the point light source 2. A certain component of the light which propagates inside the linear light guiding member 3 (specifically, linearly polarized light whose polarization direction is perpendicular to the plane of FIG. 2) is reflected by the selective-reflection portions (dielectric films) 5, and emitted through the side face 4b.

On the other hand, another component of the light which propagates inside the linear light guiding member 3 (specifically, linearly polarized light whose polarization direction is parallel to the plane of FIG. 2) passes through the selective-reflection portions (dielectric films) 5 and thereafter enters the polarization conversion portion 6, and has its polarization direction rotated by the polarization conversion portion 6 by 90°. Thus, the light which has now been converted into linearly polarized light that is capable of being reflected by the selective-reflection portions 5 (i.e., linearly polarized light whose polarization direction is perpendicular to the plane of FIG. 2) is then reflected by the selective-reflection portions 5, and emitted through the side face 4b. In FIG. 2, broken arrows indicate light which is converted by the polarization conversion portion 6 and thereafter reflected by the selective-reflection portions 5. As described above, the linear light source 1 in the present embodiment emits linearly polarized light, unlike commonly-used linear light sources.

Note that, as can be seen from FIG. 1 and FIG. 2, the incident face of light onto the dielectric films (selective-reflection portions) 5 of the linear light source 1 is orthogonal to the incident face of light onto the dielectric films 15 within the selective reflection layer 14 provided in the rear substrate 10, and vice versa. Therefore, as shown in FIG. 3, the polarization direction of the linearly polarized light which is emitted from the linear light source 1 is orthogonal to the polarization direction of the linearly polarized light that is capable of being reflected by the selective reflection layer 14 of the rear substrate 10. In the present embodiment, as shown in FIG. 1 and FIG. 3, a ½ wavelength plate 8 is provided between the linear light source 1 and the rear substrate 10, whereby linearly polarized light emitted from the linear light source 1 is allowed to enter the rear substrate 10 after having its polarization direction rotated by 90°.

The light which enters the rear substrate 10 at the side face 10a propagates inside the rear substrate 10 while repeating total reflection between the viewer-side principal face 11a of the transparent substrate 11 and a face 14a of the selective reflection layer 14 that is opposite from the viewer side. The low-refractive index layer 12 is provided in order to cause efficient total reflection of light at the viewer-side principal face 11a of the transparent substrate 11. The light propagating through the rear substrate 10 is reflected by the dielectric film 15 within the selective reflection layer 14, so as to travel toward the viewer side (i.e., toward the liquid crystal layer 30) and go out from the rear substrate 10. The light having exited the rear substrate 10 is modulated by the liquid crystal layer 30, whereby display is performed.

As described above, in the liquid crystal display device 100 of the present embodiment, the rear substrate 10 including the selective reflection layer 14 is used so that the rear substrate 10 functions as a light guiding plate. Therefore, as compared to the case where a conventional edge light type backlight is used, a thinner configuration is possible due to the omission of a light guiding plate. Since the selective reflection layer 14 of the rear substrate 10 selectively reflects linearly polarized light of a specific polarization direction (light of a specific polarization state), it is unnecessary to provide a separate polarizing plate on the rear face side of the liquid crystal layer 30, which makes further thinning possible.

Furthermore, in the liquid crystal display device 100, the linear light guiding member 3 of the linear light source 1 has the selective-reflection portions 5 and the polarization conversion portion 6, and therefore the unpolarized light which is emitted from the point light source 2 can be utilized without waste. As a result, a bright and high-contrast ratio displaying can be realized.

On the other hand, using a commonly-used linear light source which emits unpolarized light would result in a lower efficiency of light utilization. FIG. 4 shows a liquid crystal display device 600A of Comparative Example. Other than having a linear light source 601 which emits unpolarized light, the liquid crystal display device 600A has substantially the same construction as that of the liquid crystal display device 100.

In the liquid crystal display device 600A shown in FIG. 4, similarly to the liquid crystal display device 100, the rear substrate 10 functions as a light guiding plate, and therefore the entire device can be made thin. However, since the linear light source 601 emits unpolarized light, about half of the light entering into the rear substrate 10 is not reflected by the selective reflection layer 14 and thus is unavailable for display. Therefore, the efficiency of light utilization is low, and bright display cannot be performed. Moreover, the selective reflection layer 14 including the dielectric films 15 may have a low degree of polarization as compared to that of a commonly-used polarizing plate (which is formed by allowing a PVA film to adsorb a dichroic dye such as iodine or a dyestuff and drawing it). Therefore, a high contrast ratio cannot be obtained.

Figure 5:
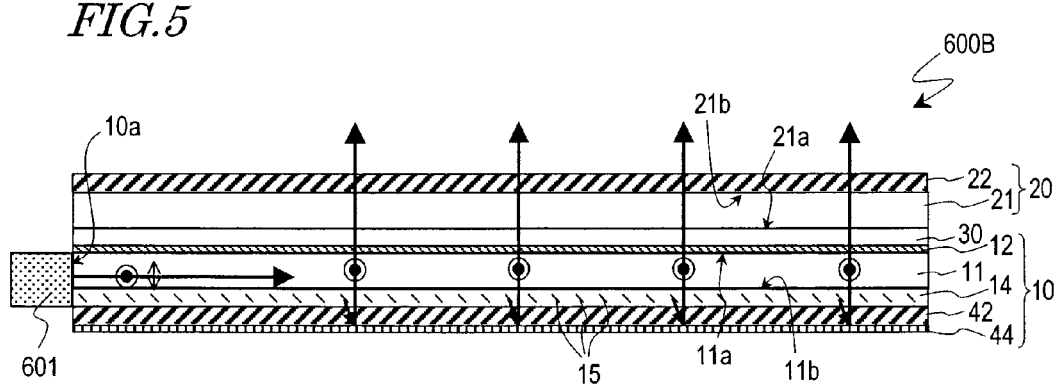
FIG. 5 A cross-sectional view schematically showing a liquid crystal display device 600B, which is a modification from the liquid crystal display device 600A shown in FIG. 4.
Figure 6:
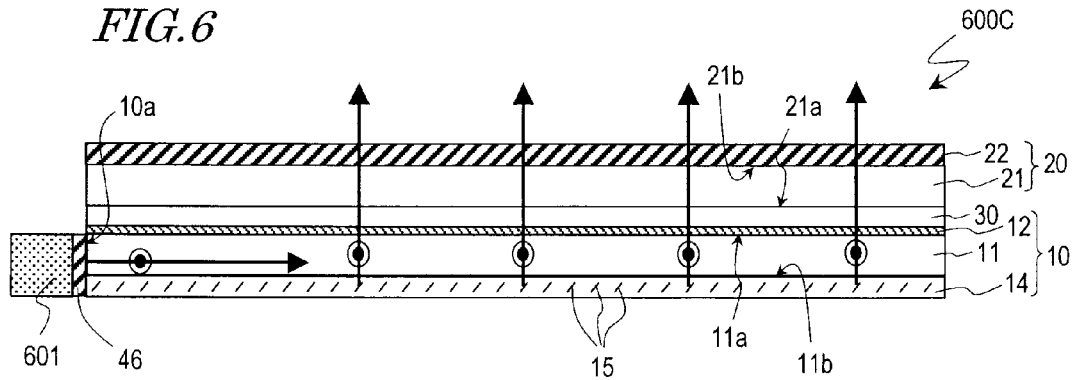
FIG. 6 A cross-sectional view schematically showing a liquid crystal display device 600C, which is a modification from the liquid crystal display device 600A shown in FIG. 4.
Figure 16:
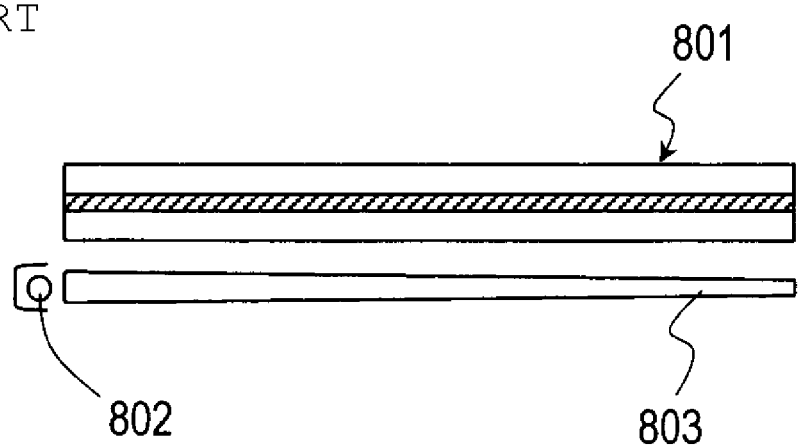
FIG. 16 A cross-sectional view schematically showing a commonly-used liquid crystal display device comprising an edge light type backlight.

In order to improve the contrast ratio of the liquid crystal display device 600A, it might be conceivable to adopt a construction such as a liquid crystal display device 600B shown in FIG. 5, or a liquid crystal display device 600C shown in FIG. 6.

The liquid crystal display device 600B shown in FIG. 5 differs from the liquid crystal display device 600A shown in FIG. 4 in that a polarizing plate 42 and a reflection plate 44 are provided on the rear face side of the selective reflection layer 14.

As shown in FIG. 5, the liquid crystal display device 600B includes a reflection plate 44 which is provided on the opposite side from the viewer with respect to the selective reflection layer 14, and a polarizing plate 42 provided between the selective reflection layer 14 and the reflection plate 44. The polarizing plate 42 is disposed so that its transmission axis is substantially parallel to the polarization direction of the light which has been reflected by the selective reflection layer 14.

In the liquid crystal display device 600A shown in FIG. 4, the dielectric films 15 in the selective reflection layer 14 are tilted so as to reflect the light propagating through the rear substrate 10 toward the liquid crystal layer 30. On the other hand, in the liquid crystal display device 600B, as shown in FIG. 5, the dielectric films 15 in the selective reflection layer 14 are tilted so as to reflect the light propagating through the rear substrate 10 toward the opposite side from the liquid crystal layer 30, i.e., toward the polarizing plate 42.

In the liquid crystal display device 600B having the aforementioned construction, a portion of the light propagating inside the rear substrate 10 and the selective reflection layer 14 is once reflected by the dielectric films 15 in the selective reflection layer 14 toward the opposite side from the liquid crystal layer 30, i.e., toward the polarizing plate 42, and after being reflected by the reflection plate 44, again passes through the polarizing plate 42, the selective reflection layer 14, and the transparent substrate 11, so as to be go out from the rear substrate 10.

In the liquid crystal display device 600B, the light having been reflected by the selective reflection layer 14 passes through the polarizing plate 42 before entering the liquid crystal layer 30, and therefore is able to attain a high contrast ratio even in the case where the selective reflection layer 14 has a low degree of polarization.

On the other hand, the liquid crystal display device 600C shown in FIG. 6 differs from the liquid crystal display device 600A shown in FIG. 4 in that a polarizing plate 46 is provided between the linear light source 601 and a side face of the rear substrate 10. The polarizing plate 46 has a transmission axis which is substantially parallel to the polarization direction of the light which is reflected by the selective reflection layer 14.

In the liquid crystal display device 600C, the light having been emitted from the linear light source 601 passes through the polarizing plate 46 before entering the rear substrate 10, and therefore is able to attain a high contrast ratio even in the case where the selective reflection layer 14 itself has a low degree of polarization.

By adopting structures such as the liquid crystal display devices 600B and 600C as described above, the contrast ratio of the liquid crystal display device 600A can be improved. However, the liquid crystal display devices 600B and 600C still have the problem of low efficiency of light utilization. Moreover, the liquid crystal display devices 600B and 600C cannot perform bright display because of their low efficiency of light utilization, and therefore the effect of improving the contrast ratio itself is smaller than that of the liquid crystal display device 100. Note that, in the liquid crystal display device 100 according to the present embodiment, polarization separation is achieved not only by the selective reflection layer 14 of the rear substrate 10 but also by the selective-reflection portions 5 of the linear light source 1. Therefore, even if the degrees of polarization of the selective reflection layer 14 and the selective-reflection portions 5 are not so high, it is possible to take out linearly polarized light having a uniform polarization direction from the rear substrate 10.

As described above, the liquid crystal display device 100 of the present embodiment is not only able to achieve a thinner configuration than conventionally, but also is able to perform a bright, high-contrast ratio, high-quality displaying.

Next, preferable constructions, variants, and the like will be described with respect to the rear substrate 10 and the linear light source 1 of the liquid crystal display device 100.

First, a preferable constitution for the low-refractive index layer 12 of the rear substrate 10 will be described. In order to cause efficient light propagation within the rear substrate 10, the difference between the refractive index of the low-refractive index layer 12 and the refractive index of the transparent substrate 11 should preferably be about 0.1 or more, and more preferably about 0.18 or more. As the material of the low-refractive index layer 12, for example, $MgF_2$ (refractive index: about 1.38), perfluoro resin (refractive index: about 1.34), or silicon oxide (refractive index: about 1.3) can be used.

Next, a preferable construction and variants of the selective reflection layer 14 of the rear substrate 10 will be described.

As an optical element which utilizes polarization dependence of reflectance at the surface of a dielectric film, polarization beam splitters and the like are known. As for the dielectric films 15 in the selective reflection layer 14, too, similarly to the dielectric films in such optical elements, it is possible to prescribe a low reflectance for P-polarized light and a high reflectance for S-polarized light by forming them so as to have a thickness which satisfies a predetermined condition regarding the wavelength of the light to be reflected.

It is experimentally known that the angle of tilt α of the dielectric films 15 (an angle of tilt with respect to the viewer-side principal face 11a of the transparent substrate 11) is preferably about no less than 50° and no more than about 60°, and more preferably about 51°. As the material of the dielectric films 15, various materials such as $MgF_2$, $SiO_2$, $Al_2O_3$, $TiO_2$, and $ZrO_2$ can be used.

The configuration (as seen from the normal direction of the liquid crystal layer 30) of the dielectric films 15 may be arbitrary. For example, the dielectric films 15 may be formed in linear (stripe) shapes as shown in FIG. 7A, or in islet (dot) shapes as shown in FIG. 7B. FIGS. 7(*a*) and (*b*) are diagrams showing the linear light source 1 and the rear substrate 10 in the layer normal direction of the liquid crystal layer 30.

With respect to the area of the principal face 11*a* of the transparent substrate 11, the proportion of the area of the dielectric films 15 as projected onto the principal face 11*a* may be constant across the principal face 11*a* as shown in FIGS. 7(*a*) and (*b*), or not constant. For example, as shown in FIGS. 8(*a*) and (*b*), the proportion of the dielectric films 5 may increase away from the linear light source 1. The light propagating inside the rear substrate 10 decreases in light amount as going away from the linear light source 1; however, by increasing the proportion of the dielectric films 15 away from the linear light source 1 as shown in FIGS. 8(*a*) and (*b*), the intensity distribution of the light going out from the rear substrate 10 can be made more uniform. In order to increase the proportion of the dielectric films 5 away from the linear light source 1, as shown in FIGS. 8(*a*) and (*b*), dielectric films 15 which are formed with a constant repetition pitch may be increased in area as going away from the linear light source 1, or dielectric films 15 which are formed so as to have generally the same area may be placed at decreasing repetition pitches away from the linear light source 1.

The selective reflection layer 14 may be formed as follows, for example.

First, as shown in FIG. 9(*a*), on a plate-like film 16 formed of a resin (e.g., ZEONOR from ZEON CORPORATION, which has a refractive index of 1.53), a plurality of protrusions 17 each having a right-triangular cross section are formed by using a resin (e.g., a UV-curable resin having a refractive index of 1.53).

Next, as shown in FIG. 9(*b*), on the slanted surface of each protrusion 17 (i.e., the surface which is tilted with respect to the principal faces of the plate-like film 16), a dielectric material (e.g., $TiO_2$ having a refractive index of 2.2 or $ZrO_2$ having a refractive index of 2.0) is vapor-deposited via a mask 9, whereby the dielectric films 15 are formed.

Then, as shown in FIG. 9(*c*), a material having adhesiveness (e.g., a UV-curable resin or adhesive material having a refractive index of 1.53) is applied so as to cover the protrusions 17, thus forming an adhesion layer 18.

Thereafter, as shown in FIG. 9(*d*), the adhesion layer 18 is allowed to come in contact with the principal face 11*b* of the transparent substrate (e.g., a glass substrate having a refractive index of 1.52) 11, and the adhesion layer 18 is allowed to cure, whereby the selective reflection layer 14 is formed on the principal face 11*b* of the transparent substrate 11.

Alternatively, the selective reflection layer 14 may also be formed as follows.

First, as shown in FIG. 10(*a*), by using a resin, a plurality of protrusions 17 each having a right-triangular cross section are formed on the plate-like film 16, which is formed from a resin. Note that the protrusions 17 are disposed with predetermined intervals therebetween, as opposed to the step shown in FIG. 9(*a*), where the protrusions 17 are disposed on the film 16 with no interspaces therebetween. The protrusions 17 are formed in such a manner that the interval between adjoining protrusions 17 becomes smaller as going away from a light source 2 which will later be disposed.

Next, as shown in FIG. 10(*b*), a dielectric material is vapor-deposited on the film 16 having the protrusions 17 formed thereon, thus forming the dielectric films 15. At this time, the dielectric films 15 are formed on the slanted surfaces of the protrusions 17 as well as on the portions of the film 16 where no protrusions 17 are formed.

Then, as shown in FIG. 10(*c*), a material having adhesiveness is applied so as to cover the dielectric films 15, thus forming an adhesion layer 18.

Thereafter, as shown in FIG. 10(*d*), the adhesion layer 18 is allowed to come in contact with the principal face 11*b* of the transparent substrate 11, and the adhesion layer 18 is allowed to cure, whereby the selective reflection layer 14 is formed on the principal face 11*b* of the transparent substrate 11.

The dielectric films 15 of the selective reflection layer 14 having been formed as described in FIGS. 10(*a*) to (*d*) each include: a tilted region 15*a* which is tilted with respect to the principal face 11*a* of the transparent substrate 11; and a parallel region 15*b* which lies parallel to the principal face 11*a*. Among these, it is the tilted region 15*a* that causes the light propagating inside the rear substrate 10 to be reflected toward the principal face 11*a* of the transparent substrate 11 at an angle which does not satisfy the total reflection condition, and therefore contributes to the takeout of light from the principal face 11*a*. In other words, only the tilted regions 15*a* function as substantial selective reflection films.

The formation steps shown in FIGS. 9(*a*) to (*d*) require a mask 9 to control the positioning of the reflection films 15. On the other hand, with the formation steps shown in FIGS. 10(*a*) to (*d*), it is possible to control the positioning of the tilted regions 15*a* (which substantially function as reflection films) by merely adjusting the positioning of the protrusions 17, and thus the formation steps are simplified.

The dielectric films (selective-reflection portions) 5 of the linear light source 1 may take various constructions, as is the case with the dielectric films 15 included in the selective reflection layer 14 of the rear substrate 10. Moreover, the dielectric films 5 of the linear light source 1 can be formed in a similar manner to the dielectric films 15 of the rear substrate 10. For example, a base light guiding member 4 composed of a resin may be provided, and an appropriate dielectric material may be applied to the side face 4*c* of the base light guiding member 4 which is in the form of a prism array, thus forming the dielectric films 5.

Although the present embodiment illustrates a selective reflection layer 14 having internal dielectric films 15 and selective-reflection portions 5 which are dielectric films, the selective reflection layer 14 and the selective-reflection portions 5 are not limited to what is illustrated herein. Those which selectively reflect light in a specific polarization state are broadly applicable. A selective reflection layer 14 and selective-reflection portions 5 including dielectric films, such as those illustrated in the present embodiment, can be produced through a simple production process, and make it possible to realize a high reflectance for S-polarized light by prescribing a large difference between the reflectance for P-polarized light and the reflectance for S-polarized light.

Moreover, by using the selective reflection layer 14 as illustrated in the present embodiment, a high directivity can be imparted to the light going out from the rear substrate 10. In other words, the luminance of the light going out from the rear substrate 10 can be made significantly high in the display-surface normal direction (frontal direction). If the light emitted from the rear substrate 10 has a high directivity, there is little light that obliquely enters the liquid crystal layer 30, and therefore the light passing through the liquid crystal layer 30 can be uniformly modulated. That is, a uniform retardation can be imparted to the light passing through the liquid crystal layer 30. Therefore, the viewing angle dependence of display quality which is associated with the refractive index anisotropy of liquid crystal molecules can be reduced. As it is, light having passed through the liquid crystal layer 30 has a high directivity, and has a large imbalance in luminance (i.e., the luminance in the display-surface normal direction is significantly high, but the luminance in oblique directions is low). However, as in a liquid crystal display device 200 shown in FIG. 11, a light diffusing element 50 may be provided on the viewer side of the liquid crystal layer 30, whereby imbalance in the luminance of the light passing through the liquid crystal layer 30 can be reduced, and the viewing angle can be broadened.

The light diffusing element 50 is a lenticular lens sheet having a plurality of lenticular lenses 51 in semicolumnar shapes, as shown in FIG. 11, for example. A planarization layer 50b is formed over a lens layer 50a which includes the plurality of lenticular lenses 51, such that a refractive index n1 of the lens layer 50a and a refractive index n2 of the planarization layer 50b are prescribed so as to satisfy the relationship n1<n2.

Light which has passed through the liquid crystal layer 30 and entered the light diffusing element 50 is diffused by the lenticular lenses 51. Since each lenticular lens 51 diffuses light mainly in a direction which is orthogonal to the direction along which it extends, the directions along which the lenticular lenses 51 extend are to be appropriately set in accordance with the intensity distribution of light going out from the rear substrate 10.

Note that various known elements can be used as the light diffusing element 50. Although FIG. 11 illustrates a construction in which the convex lenses 51 are provided in the light diffusing element 50, concave lenses 51' may be provided as in a light diffusing element 50A shown in FIG. 12. Alternatively, as the light diffusing element 50, a prism sheet including a plurality of prisms (e.g., a total-reflection type prism sheet) may be used.

Furthermore, a diffusion film 50B which utilizes internal scattering may be used as shown in FIG. 13. As shown partially enlarged in FIG. 13, the diffusion film 50B (which may also be referred to as a "diffuser") includes a matrix 53 composed of a resin material and particles 54 which are dispersed in the matrix 53 and have a different refractive index from the refractive index of the matrix 53.

Moreover, as shown in FIGS. 14(a) and (b), a combination of the diffusion film 50B and the lens sheet 50 or 50A may be used. Alternatively, a combination of the diffusion film 50B and a prism sheet may be used. Whereas a lens sheet or a prism sheet causes anisotropic diffusion of light, the diffusion film 50B diffuses light in a relatively isotropic manner. Therefore, by combining these, a desired luminous intensity distribution can be easily realized.

The polarization conversion portion 6 which is provided on the dielectric films (selective-reflection portions) 5 may be formed by, for example, forming a planarization layer by applying a resin or the like onto the dielectric films 5, and attaching a phase difference film over this planarization layer. Alternatively, the polarization conversion portion 6 may also be formed by applying a polymer liquid crystal material of a UV-curable type or thermosetting type, etc., onto the dielectric films 5.

Note that, although a ½ wavelength plate is used as the polarization conversion portion 6 in the present embodiment, it is not necessary to use a phase difference plate such as a ½ wavelength plate for the polarization conversion portion 6. So long as it is composed of a material having birefringence, the polarization conversion portion 6 will be able to convert at least a portion of the polarization component that is not reflected by the selective-reflection portions 5 into a polarization component that is reflected by the selective-reflection portions 5, and thus can function as the polarization conversion portion 6. Therefore, the polarization conversion portion 6 may be an element that does not qualify as a phase difference plate (e.g., an element whose slow axis is diverse over the entire element). However, using a phase difference plate such as a ½ wavelength plate will enable an efficient polarization conversion.

Moreover, in the present embodiment, the ½ wavelength plate 8 is provided between the linear light source 1 and the rear substrate 10 in order to ensure that the light which is emitted from the linear light source 1 is in a polarization state such that it can be reflected by the selective reflection layer 14 of the rear substrate 10. However, it is not necessary to provide such a polarization conversion element. In the case where the linear light source 1 is able to directly emit light in a polarization state such that it can be reflected by the selective reflection layer 14, it is unnecessary to provide a polarization conversion element. As the polarization conversion element, it is not necessary to provide a ½ wavelength plate, and a wavelength plate which is in accordance with the angle between the polarization direction of the linearly polarized light that is emitted from the linear light source 1 and the polarization direction of the linearly polarized light that can be reflected by the selective reflection layer 14 may be used.

According to the present invention, there is provided a liquid crystal display device which can easily be made thin and which is capable of high-quality displaying. The liquid crystal display device according to the present invention can be suitably used for various electronic devices, and particularly suitably used for mobile electronic devices such as mobile phones and PDAs.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
 a first substrate;
 a second substrate disposed so as to be closer to a viewer than the first substrate is;
 a liquid crystal layer provided between the first substrate and the second substrate; and
 a linear light source provided by a side of the first substrate, the linear light source emitting light toward a side face of the first substrate, wherein, the first substrate includes a selective reflection layer for selectively reflecting light of a specific polarization state;
 the linear light source includes a point light source and a linear light guiding member for guiding light emitted from the point light source to the side face of the first substrate; and
 the linear light guiding member includes: a selective-reflection portion for selectively reflecting light of a first polarization state out of light which enters into the linear light guiding member from the point light source; and a polarization conversion portion for, out of the light which enters into the linear light guiding member from the point light source, converting light of a second polarization state into light of the first polarization state, the second polarization state being different from the first polarization state.

2. The liquid crystal display device of claim 1, wherein light of the first polarization state is linearly polarized light whose polarization direction is parallel to the first direction, and light of the second polarization state is linearly polarized light whose polarization direction is parallel to a second direction which is orthogonal to the first direction.

3. The liquid crystal display device of claim 2, wherein the selective reflection layer of the first substrate selectively reflects linearly polarized light of a specific polarization direction.

4. The liquid crystal display device of claim 1, wherein the selective-reflection portion of the linear light guiding member includes a dielectric film.

5. The liquid crystal display device of claim 1, wherein the polarization conversion portion is composed of a material having birefringence.

6. The liquid crystal display device of claim 5, wherein the polarization conversion portion is a ½ wavelength plate.

7. The liquid crystal display device of claim 1, wherein the linear light guiding member has a first side face at which light from the point light source is received and a second side face through which light is emitted toward the side face of the first substrate.

8. The liquid crystal display device of claim 7, wherein the selective-reflection portion is disposed between the polarization conversion portion and the second side face.

9. The liquid crystal display device of claim 1, wherein the first substrate includes: a transparent substrate; and a low-refractive index layer formed on a principal face of the transparent substrate closer to the liquid crystal layer, the low-refractive index layer having a refractive index lower than a refractive index of the transparent substrate.

10. The liquid crystal display device of claim 9, wherein the selective reflection layer is provided on a principal face of the transparent substrate opposite from the liquid crystal layer.

11. The liquid crystal display device of claim 1, further comprising a light diffusing element disposed so as to be closer to the viewer than the liquid crystal layer is, the light diffusing element diffusing light which has passed through the liquid crystal layer.

12. A mobile electronic device comprising the liquid crystal display device of claim 1.

* * * * *